Dec. 31, 1940.  L. C. COLE  2,226,897
CASTING ROD
Filed Dec. 20, 1938
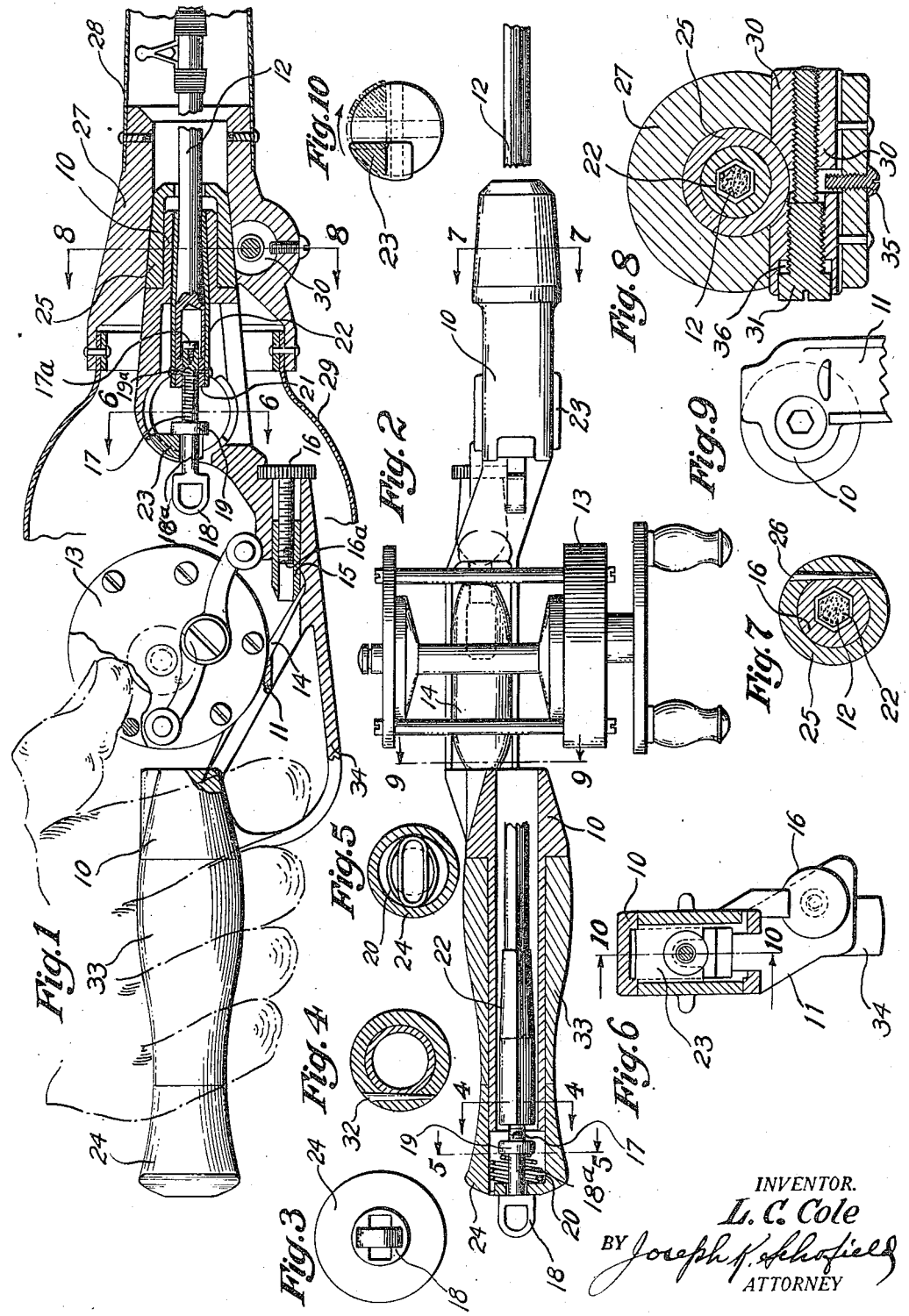
INVENTOR.
*L. C. Cole*
BY *Joseph K. Schofield*
ATTORNEY Patented Dec. 31, 1940

2,226,897

UNITED STATES PATENT OFFICE 2,226,897

CASTING ROD

Lyndon C. Cole, Hamilton, Ohio

Application December 20, 1938, Serial No. 246,852

8 Claims. (Cl. 43—18)

This invention relates to fishing rods and particularly to an improved form of casting rod adapted to be completely balanced when assembled with its reel and which may have its stick retracted for convenient carrying.

An object of the invention is to provide a recessed and laterally offset reel seat enabling a reel to be mounted thereon in a position having its centre of gravity in alinement with the axis of the handle and stick.

Another object of importance is to provide improved attaching means for the stick in its forward or operative position and in its retracted or carrying position so that the stick may be quickly moved from carrying to advanced position and vice versa and be secured to the handle portion in either position.

And finally it is an object of the invention to provide improved constructions for attaching a reel to the handle portion of the rod and to provide an improved mounting on the stick for a threaded member forming a portion of the attaching means therefor and by means of which the stick may be securely fastened to the handle in its advanced and retracted positions.

This application constitutes an improvement upon the construction described and shown in my copending application Serial No. 168,165, filed October 9, 1937.

With the above and other objects in view, the invention includes the features of construction and operation set forth in the following specification and illustrated in the accompanying drawing.

In the accompanying drawing annexed hereto and forming a part of this specification, I have shown the invention embodied in a light casting rod but it will be understood that the invention can be otherwise embodied and that the drawing is not to be construed as defining or limiting the scope of the invention, the claims appended to this specification being relied upon for that purpose.

In the drawing:

Fig. 1 is a longitudinal view of the handle portion of the complete rod, a portion of the stick and a portion of the carrying case being also shown, parts being shown in section to more clearly disclose their construction;

Fig. 2 is a plan view of the rod shown in Fig. 1, the casing being omitted and the butt end of the handle portion being shown in section to indicate the position of the stick in its retracted position;

Fig. 3 is an end view of the handle portion;

Fig. 4 is a transverse sectional view of the handle portion taken on the plane of line 4—4 in Fig. 2;

Fig. 5 is a transverse sectional view of the handle portion taken on the plane of line 5—5 in Fig. 2;

Fig. 6 is a transverse sectional view of the handle at an intermediate portion to show the spool mounting, the view being taken on the plane of line 6—6 in Fig. 1;

Fig. 7 is a transverse sectional view of the handle at its forward end taken on the plane of line 7—7 in Fig. 2;

Fig. 8 is a transverse sectional view of the handle and carrying case taken on the plane of line 8—8 in Fig. 1;

Fig. 9 is a transverse view of the butt end of the handle taken on the plane of line 9—9 in Fig. 2; and Fig. 10 is a detail view of the spool forming 20 part of the stick attaching means, the view being taken on the plane of line 10—10 in Fig. 6.

In the above mentioned drawing there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: first, a handle having a longitudinal opening extending to the butt end thereof; second, a stick attachable to the handle portion in an extended and in a retracted position; third, a reel seat on the handle portion extending below the axis of the handle and laterally offset therefrom; fourth, attaching means in the form of a screw mounted on the stick for securing the stick in its advanced and retracted positions, and fifth, attaching means for a carrying case engaging the forward portion of the handle.

Referring more in detail to the figures of the drawing there is shown at 10 a handle portion of a casting rod having an oblique and downwardly inclined intermediate portion 11 forming a reel seat. The handle 10 may be formed principally of a single casting presently to be more fully described. The rear and forward ends of the handle portion are in alinement with each other and the casting forming the principal member of the handle has an opening extending completely and axially through it. Within this opening extends a major portion of the stick 12 when in its retracted position.

As may be best seen in Figs. 1 and 2 of the drawing the intermediate portion 11 of the handle 10 is offset laterally relative to the longitudinal axis of the handle. Within this offset portion a reel 13 may be detachably mounted in any usual or standard manner, its saddle 14 being held against an inclined downward extending surface of member 11 by means of a clamping member 15 preferably of non-circular cross-section, movable into and out of clamping position by a screw 16 having a knurled head. At its rear end the reel saddle 14 enters a small recess formed within the member 11. Drive screw 16a prevents sleeve 15 from moving off the threads of 16 when this reel 13 is removed. The body and weight of the reel 13 is brought down a material distance so that its weight and centre of gravity is substantially alined with the axis of the handle 10 in a vertical plane by its being mounted upon the downwardly inclined surface of the intermediate portion 11. By reason of the lateral offset of this intermediate portion 11 the centre of gravity of the reel 13 is disposed substantially in alinement with the axis of the handle. In this manner the weight of the reel 13 is completely balanced relative to the rod both vertically and laterally so that in casting the weight of the reel will not cause twisting of the rod. Grip piece 33 can be held loosely in the hand during the casting action. The complete handle with the reel 13 mounted in position thereon has the weight distributed symmetrically so that the rod acts in casting as a uniformly weighted lever without any twisting movement.

The intermediate portion of the handle in the rear of the oblique portion 11 may be formed into a loop 34 within which the fore finger of one using the rod may rest during casting. This loop 34 adds rigidity to the frame of 10, but any downward projection to prevent the hand from slipping back will be satisfactory.

The stick 12 is preferably and as shown of hexagonal cross section and has mounted thereon the usual guiding eyes for a line from the reel 13. The butt end of the stick 12 has secured thereon a metal sleeve 22 the forward portion of which is tapered and of hexagonal or non-circular cross section. Housed within the rearward portion of the metal sleeve 22 is a nut 21 within which screw 17 may be threaded. As shown the stick 12 at its rear end is recessed forming an opening into which the screw 17 may extend. To prevent the screw 17 separating from its nut 21 at any time a headed drive screw 17a may be mounted on the end of the threaded end, the head having the full diameter of the threads. The nut 21 may first be threaded on the screw 17 and the small screw 17a driven in place. With the nut 21 on the screw 17 the nut 21 is fastened to the sleeve 22 by several radially disposed drive screws or other suitable fastening means 19a permanently securing it thereto.

The screw 17 has spaced heads thereon one of which 19, when the stick 12 is in its advanced or operative position, bears against an angularly adjustable spool 23. Spool 23 is housed within the casting 10 of the handle and is rotated as indicated in Fig. 10 from the position shown in full lines in Fig. 10 to the position indicated by dotted lines.

In the position shown in Fig. 1 the head 19 on screw 17 bears against the sides of the central recessed part of the spool 23, a U shaped opening being cut away to permit 23 to be angularly engaged over 18a. Screw 17 is positioned in 21 so that the space between 19 and 18 permits the easy engagement of 23 over 18a. By turning the screw 17 by means of its head 18 member 19 is pressed against 23, the reaction of this force causes the stick 12 and its sleeve 22 to be secured in fixed position in the hexagonal opening or bearing within the casting 10.

To retract the stick 12 to its carrying position the screw 17 is turned in the opposite direction until 18 engages 23, the reaction loosens 22 in 10 which in turn loosens the member 23 to permit member or spool 23 to be turned about on its circular bearings withdrawing the U shaped opening from 18a shown in Fig. 6. For this purpose projections are formed on the outer walls enabling the member 23 to be rotated through approximately 90°. The central portion of the member 23 is then above the axis of the stick 12 and permits the stick to be retracted with the screw 17 still mounted thereon. When retracting the stick 12 to its carrying position the reel 13 must first be removed from its seat 11. Opening in 24 and opening in spring 20 are in alignment, therefore 18 must be positioned horizontal before retracting. In retracted position the head 18 of the screw 17 which is flattened on opposite sides passes through coiled spring 20 secured at one end within the butt piece 24 the forward end of which is flattened as shown in Fig. 5 for that purpose. Head 19 which is circular then bears against the inner end of spring 20. By gripping the handle 10 in one hand and rod 12 in the other hand, a rear thrust of the rod will permit 18 to pass through the slot in 24 after which 18 is turned 90° to lock the rod 12 from going forward. The friction of 18 against 24 caused by spring pressure prevents 18 from turning and dropping through the slot. This resiliently retains the stick in its carrying position.

The butt piece 24 pinned to the end of the handle by pin 32 has a slot therein so that head 18 may pass through this member enabling the screw 17 to be turned. A grip member 33 of rubber or composition is mounted on the rear end of casting 10 and is maintained in place by the butt piece 24. All parts therefore of the handle and the stick are prevented from becoming separated.

At the forward end of the handle 10 there is mounted a conical member 25 secured in position by a tapered pin 26 shown in Fig. 7 to the extreme front end of the casting 10. Fittting over this member is the collar 27 of the casing 28 in the form of a long metal tube closed at its outer or forward end and enclosing the stick 12 when in retracted position. A flexible bag 29 a part only of which is shown is secured to the collar 27 as by means of rivets and a circular metal band shown in Fig. 1. This bag is sufficient in size to enclose the entire handle 10 and may have an opening extending lengthwise therethrough closed by any suitable means. As the tube 28 and bag 29 may be similar to the corresponding parts of the carrying case described in the above described application further description is not thought to be necessary.

To secure the carrying case to the handle the collar 27 is provided with clamping members 30 which may be drawn together to frictionally and tightly engage the member 25 by means of a left and right screw 31 extending through the members 30. Screw 35 prevents 30 from falling out of the collar 27 when the cover is removed from the rod. Counterbore 36 permits unscrewing screw 31 far enough to loosen the member 27 from the tapered portion 25. Movement of the screw 31, however, is limited by this counterbore 36 so that members 30 are prevented from becoming separated from the screw 31.

The handle 10 shown in the drawing comprises a main member of cast metal extending substantially the entire length of the handle. The butt piece 24 recessed as shown and within which the spring 20 is mounted may be pinned to the casting 10 by means of a tapered pin 32. This member 24 retains in position the grip member 33 in the form of a sleeve fitting a cylindrical portion of the handle casting 10. Below and in the rear of the reel seat 11 is a finger loop 34 preferably formed integrally with the handle.

I claim as my invention:

1. A casting rod comprising in combination, a handle, an intermediate portion thereof laterally disposed relative to the longitudinal axis of said handle and having oblique surfaces thereon, and reel seating and clamping means on said intermediate oblique portion.

2. A casting rod comprising in combination, a handle, a laterally offset and oblique downward extending intermediate portion, and reel mounting and clamping means on said intermediate portion, whereby a reel mounted on said handle will have its center of gravity in alinement with the longitudinal axis of said handle.

3. A casting rod comprising in combination, a handle, a laterally offset and oblique downward extending intermediate portion, and reel mounting and clamping means on said intermediate portion, an opening extending longitudinally through said handle, a stick mounted in said handle, and means to secure said stick alternatively at spaced positions therein.

4. A casting rod comprising in combination, a handle portion, a stick, a sleeve on the rear end of said stick having a non-circular tapered portion, a bearing within said handle portion fitting said tapered sleeve, means to retain said sleeve in said bearing, and means to retain said stick in a retracted position within said handle.

5. A casting rod comprising in combination, a handle portion, a stick, a sleeve on the rear end of said stick having a non-circular tapered portion, a bearing within said handle portion fitting said tapered sleeve, a nut secured within said sleeve, and a screw bearing against a portion of said handle and engaging said nut, whereby said sleeve may be retained within its bearing.

6. A casting rod comprising in combination, a handle portion, a stick, a sleeve on the rear end of said stick having a non-circular tapered portion, a bearing within said handle portion fitting said tapered sleeve, a screw engaging a nut within said stick, and an angularly adjustable member housed within said handle portion, whereby in one position of said angularly adjustable member said sleeve may be retained within its bearing and in another position of said angularly adjustable member said stick may be retracted to a position partially within said handle portion.

7. A casting rod comprising in combination, a handle portion, a stick, a sleeve on the rear end of said stick having a non-circular tapered portion, a bearing within said handle portion fitting said tapered sleeve, a screw engaging a nut within said stick, an angularly adjustable member housed within said handle portion, whereby in one position of said angularly adjustable member said sleeve may be retained within its bearing and in another position of said angularly adjustable member said stick may be retracted to a position partially within said handle portion, said screw being used to retain said stick in its advanced and in its retracted position.

8. A casting rod comprising in combination, a handle portion, a stick, a sleeve on the rear end of said stick having a non-circular tapered portion, a bearing within said handle portion at its forward end fitting said tapered sleeve, a screw rotatably but non-removably mounted on said stick, a nut within said sleeve adapted to engage therewith, and an angularly adjustable member housed within said handle portion, whereby in one position of said angularly adjustable member said sleeve may be retained within its bearing by said screw, and in another position of said angularly adjustable member said stick may be retracted to a position partially within said handle portion and retained therein by said screw.

LYNDON C. COLE.